UNITED STATES PATENT OFFICE.

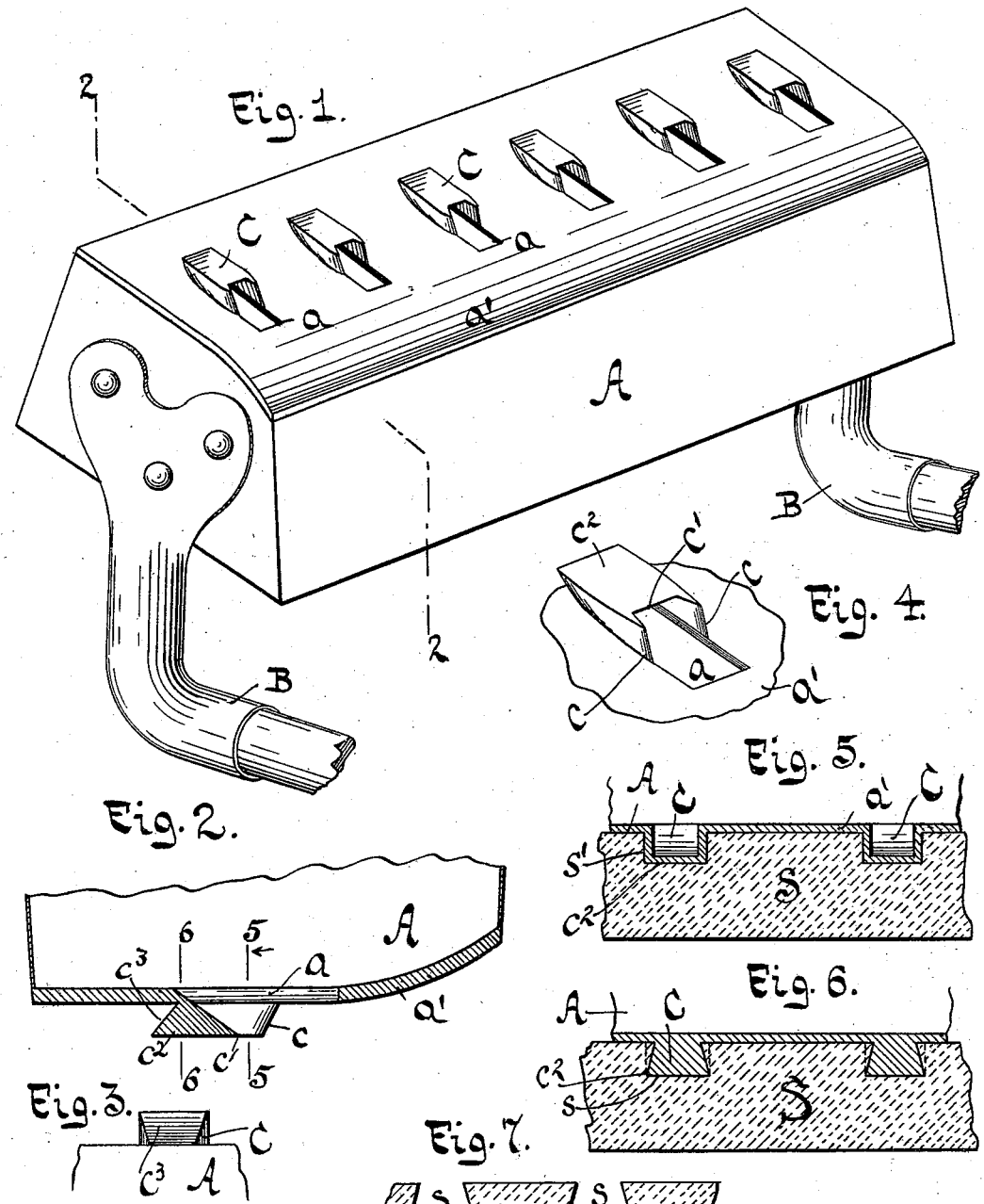

JAMES G. WILSON, OF NEW YORK, N. Y.

METHOD OF AND IMPLEMENT FOR FORMING GROOVES.

SPECIFICATION forming part of Letters Patent No. 531,243, dated December 18, 1894.

Application filed August 3, 1894. Serial No. 519,350. (No model.)

*To all whom it may concern:*

Be it known that I, JAMES G. WILSON, a subject of the Queen of Great Britain, and a resident of New York, in the county and State of New York, have invented certain new and useful Improvements in Methods of and Implements for Forming Grooves, of which the following is a specification.

My invention has reference to the construction of block-flooring and especially to a method of and an implement for forming dovetail grooves or chases into the concrete bed, or substructure, while the latter is in a plastic state,—for the purpose of affording means for firmly retaining the cementitious material subsequently spread thereon and into which the wooden blocks are laid.

The object of my present invention is to provide an implement for forming dovetail grooves or chases into the substructure by actually cutting and removing the material, instead of merely forcing the material apart, whereby I am enabled to obtain clean cut and regular grooves or chases, while the substructure retains an even surface.

The nature of my invention will best be understood when described in connection with the accompanying drawings, in which—

Figure 1 represents a perspective (inverted) view of an implement constructed according to my invention. Fig. 2 is a cross-section, on an enlarged scale, in the plane 2—2, Fig. 1. Fig. 3 is an end view of part of the implement. Fig. 4 is a perspective (inverted), on an enlarged scale, of one of the cutters. Fig. 5 is a sectional elevation illustrating the first stage in the formation of the grooves in the substructure—the line of section being on 5—5, Fig. 2. Fig. 6 is a similar view illustrating the second stage—the line of section being on 6—6, Fig. 2. Fig. 7 is a sectional view of the substructure showing the finished grooves.

Similar letters of reference designate corresponding parts throughout the several views of the drawings.

Referring now to the drawings, the letter A designates a receptacle adapted to receive the material removed from the substructure S in forming the grooves $s$. In its bottom $a'$ is formed a series of rectangular orifices $a$ and beneath the same is located a series of cutters C of peculiar construction and having for their object to form the dovetail grooves $s$, by cutting and removing the material to form rectangular grooves $s'$, which are converted immediately thereafter into dovetail grooves, by reason of the form of the cutter and the downward pressure of the implement upon the substructure. The construction of said cutters is as follows:—At the forward end of each cutter are two cutting edges $c\ c$, Figs. 2 and 4, forming the terminals of the sides of the cutter, and a third horizontal cutting edge $c'$ formed at the front end of the flat bottom $c^2$ of the cutter. The sides of the cutter project beyond the cutting edge $c'$ so that the material is cut laterally before being lifted. The edges $c\ c$ are preferably inclined to insure perfect cutting. The forward end of the cutter is therefore constructed to cut a rectangular groove, such as $s'$ (Fig. 5), having nearly the same width as the bottom of the finished dovetail groove $s$. The interior lower side of the cutter is beveled to gradually carry the severed material upwardly into the receiver A. The sides of the cutter run parallel, or slightly divergent, for a short distance forming substantially right angles with the bottom $a'$. They then gradually curve inwardly while the bottom $c^2$ of the cutter remains substantially its original width, thereby forming a dovetail of gradually increasing angularity. The rear face $c^3$ of the cutter forms an angle of about forty-five degrees with the bottom $a'$.

To the receiver A are secured suitable handles B for pushing it over the concrete bed.

The action of the implement when in use is as follows:—On drawing the implement forward over the bed of concrete material, while in a plastic condition, substantially rectangular cuts $s'$ are first made by the cutting edges $c\ c$ and $c'$, and, as the forward motion continues, the bottom $a'$ of the receiver presses down the material against the rear dovetail shaped part of the cutter, thereby forming corresponding dovetail grooves and smoothing the surface of the bed.

As before stated, the width of the rectangular grooves is substantially the same as the finished groove. Consequently as much material is actually removed as would correspon to the body of the finished grooves and no irregularities in the substructure are produced.

While I have herein shown an implement containing six cutters, it is evident that more or less can be used.

What I claim as new is—

1. In an implement of the character specified, the combination of a receiver for the material removed, containing a series of orifices in its bottom, cutters arranged opposite said orifices constructed to cut substantially rectangular slots, and terminating in dovetails, substantially as described.

2. In an implement of the character specified, the combination of a receiver for the material removed, containing a series of orifices in its bottom, cutters arranged opposite said orifices having side and bottom cutting edges, and inwardly curved sides forming dovetails, substantially as described.

3. In an implement of the character set forth, the combination of a receiver for the material removed containing a series of orifices, cutters arranged opposite said orifices and having side and bottom cutting edges, substantially rectangular bottoms, inwardly curved sides, and inclined backs, substantially as described.

4. The herein described implement provided with cutters having side and bottom cutting edges in front, and sides curving inwardly toward the back of the cutters to form dovetails, substantially as and for the purpose set forth.

5. An implement composed of a number of cutting and forming tools attached to a plate provided with orifices above the cutters, and a hopper for the reception of the material removed; all constructed for cutting and forming simultaneously in a plastic material a number of parallel grooves, the sides of which are at an angle to the surface, substantially as described.

6. The herein described method of forming a dovetail groove in plastic material by one continuous operation, consisting in forming a substantially rectangular groove and forcing in the sides radially by downward pressure.

In testimony that I claim the foregoing as my invention I have signed my name, in presence of two witnesses, this 31st day of July, 1894.

JAMES G. WILSON.

Witnesses:
W. A. ROEDEL,
ARCHD. MCNICOLL.